(12) United States Patent
Lee

(10) Patent No.: US 7,477,445 B2
(45) Date of Patent: Jan. 13, 2009

(54) ELECTROPHORETIC INDICATION DISPLAY

(75) Inventor: Yong-Uk Lee, Seongnam-si (KR)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 28 days.

(21) Appl. No.: 11/545,010

(22) Filed: Oct. 6, 2006

(65) Prior Publication Data
US 2007/0171512 A1 Jul. 26, 2007

(30) Foreign Application Priority Data
Jan. 18, 2006 (KR) .................. 10-2006-0005344

(51) Int. Cl.
G02B 26/00 (2006.01)
G09G 3/34 (2006.01)
(52) U.S. Cl. .............. 359/296; 359/245; 345/107; 345/102; 345/55; 345/204; 345/173; 349/12; 349/42; 349/113; 349/139; 349/187; 438/22
(58) Field of Classification Search .......... 359/296, 359/245, 252, 315, 321, 452, 453, 883; 345/30, 345/37, 55, 76, 80, 84, 87, 89, 92, 98, 102, 345/105, 173–182, 204; 349/12, 43, 48, 349/113, 139, 143, 187; 427/301; 430/32, 430/34, 38; 438/22, 149; 257/40, 59, 66, 257/72, 197, 213, 347
See application file for complete search history.

(56) References Cited

U.S. PATENT DOCUMENTS

| 6,683,333 B2 * | 1/2004 | Kazlas et al. ........... 257/197 |
| 6,778,151 B2 * | 8/2004 | Li ........................... 345/55 |
| 6,914,644 B2 * | 7/2005 | Fukami et al. ........... 349/42 |
| 7,132,796 B2 * | 11/2006 | Lee et al. ............... 313/610 |
| 7,176,880 B2 * | 2/2007 | Amundson et al. ...... 345/107 |
| 7,280,167 B2 * | 10/2007 | Choi et al. .............. 349/12 |
| 2002/0186209 A1 | 12/2002 | Cok |

(Continued)

FOREIGN PATENT DOCUMENTS

JP 2000-047266 2/2000

(Continued)

OTHER PUBLICATIONS

English Language Abstract, JP Patent First Publication No. 2005-173709, Mar. 6, 2005 1 page.

(Continued)

*Primary Examiner*—Loha Ben
(74) *Attorney, Agent, or Firm*—Macpherson Kwok Chen & Heid LLP; Mark A. Pellegrini

(57) ABSTRACT

An electrophoretic display having a pair of substrates separated by a microcapsule layer, a plurality of pixels formed at the intersections of rows of gate lines and columns of data lines on at least one of the substrates, wherein at least one of said substrates is sufficiently flexible when touched to change the separation between said substrates at any of said pixels, a plurality of sense signal lines formed parallel to the data lines, and a sense signal processing unit connected with the sense signal lines for sensing a change in capacitance between said substrates at any of said pixels.

12 Claims, 12 Drawing Sheets

U.S. PATENT DOCUMENTS

| | | | |
|---|---|---|---|
| 2003/0179438 A1 | 9/2003 | Yanagawa | |
| 2004/0004605 A1 | 1/2004 | David | |
| 2004/0263948 A1* | 12/2004 | Lee et al. | 359/296 |
| 2005/0099559 A1* | 5/2005 | Lee et al. | 349/113 |
| 2005/0266590 A1* | 12/2005 | Roh et al. | 438/22 |
| 2006/0279526 A1* | 12/2006 | Zhou et al. | 345/107 |
| 2007/0013683 A1* | 1/2007 | Zhou et al. | 345/204 |
| 2007/0085818 A1* | 4/2007 | Amundson et al. | 345/102 |

FOREIGN PATENT DOCUMENTS

| | | |
|---|---|---|
| JP | 2001-117069 | 4/2001 |
| JP | 2004-317624 | 11/2004 |
| JP | 2005-107246 | 4/2005 |
| JP | 2005-114820 | 4/2005 |
| JP | 2005-173709 | 6/2005 |
| KR | 10-0381115 | 4/2003 |
| KR | 20040018186 | 3/2004 |
| KR | 2004-0044930 | 5/2004 |
| KR | 2005-0026079 | 3/2005 |
| KR | 2005-0034757 | 4/2005 |
| KR | 2005-0042917 | 5/2005 |

OTHER PUBLICATIONS

English Language Abstract, KR Patent First Publication No. 20050042917, Nov. 5, 2005, 1 page.

English Language Abstract, JP Patent First Publication No. 2005-114820, Apr. 28, 2005, 1 page.

English Language Abstract, JP Patent First Publication No. 2005-107246, Apr. 21, 2005, 1 page.

English Language Abstract, KR Patent First Publication No. 2005-0034757, Apr. 14, 2005, 1 page.

English Language Abstract, KR Patent First Publication No. 2005-0026079, Mar. 14, 2005, 1 page.

English Language Abstract, JP Patent First Publication No. 2004-317624, Nov. 11, 2004, 1 page.

English Language Abstract, KR Patent First Publication No. 2004-0044930, May 31, 2004, 1 page.

English Language Abstract, KR Patent First Publication No. 20040018186, Mar. 2, 2004, 1 page.

English Language Abstract, KR Patent First Publication No. 10-381115, Apr. 8, 2003, 1 page.

English Language Abstract, JP Patent First Publication No. 2001-117069, Apr. 27, 2001, 1 page.

English Language Abstract, JP Patent First Publication No. 2000-047266, Feb. 18, 2000, 1 page.

* cited by examiner

ELECTROPHORETIC INDICATION DISPLAY

CROSS-REFERENCE TO RELATED APPLICATION

This application claims priority to and the benefit of Korean Patent Application No. 10-2006-0005344 filed in the Korean Intellectual Property Office on Jan. 18, 2006, the entire contents of which are incorporated herein by reference.

FIELD OF THE INVENTION

The present invention relates to an electrophoretic indication display.

DESCRIPTION OF THE RELATED ART

An electrophoretic indication display (EPD) is a type of flat panel display used for e-books, that includes two display panels having facing field generating electrodes between which are microcapsules containing electronic ink comprised of electrically charged white and black pigment particles. The voltage applied to the facing electrodes causes the charged black and white pigment particles to move to the electrode having the opposite polarity to that of the particles, thereby displaying an image.

The EPD has high reflectivity and contrast ratio and, unlike liquid crystal displays (LCDs), it is not dependent on a viewing angle so it can display an image easily as if it is on paper. Also, having black and white bi-stable characteristics, the EPD can sustain images without having to continuously apply a voltage, so power consumption is very low. In addition, since a polarizer, an alignment layer, and liquid crystal requisite for an LCD are not necessary, the EPD can be less expensive than an LCD.

Recently, a touch screen panel (TSP) has been commonly employed as an input unit that reads the coordinates of the point touched by the user. Typically, in order to provide a touch screen function to an EPD, a touch panel is stacked to be attached on a surface of the EPD. However, such a structure tends to produce picture images that float due to the disparity in light transmission between the electrophoretic indication display panel and the touch panel.

SUMMARY OF THE INVENTION

The present invention provides an EPD having a microcapsule layer between two panels that performs the functions of both a display as well as a touch panel. A plurality of sense signal lines are formed in parallel with the data lines of the display. When a particular pixel of the EPD is touched by a finger or other object, the cell gap of the microcapsule layer changes bringing about a change in the pixel capacitance. The change in the capacitance of a given pixel is sensed by charging that pixel capacitor from the data signal present when the gate line for the row two before the present pixel's row is scanned and the charge is read when the gate line for the row before the present pixel is scanned. When the gate line for the present pixel's row is scanned the pixel capacitance is charged by the current data signal for displaying the current image.

An EPD is manufactured by forming a gate line and first, second and third gate electrodes on a substrate; forming a gate insulating layer that covers the gate line; forming first, second and third semiconductors on the gate insulating layer; forming a data line to cross the gate line under the gate insulating layer and the first to third semiconductors and including first to third source electrodes and first to third drain electrodes; forming a sense signal line parallel to the data line; forming a passivation layer for covering the data line and the sense signal line and having contact holes that expose the first and second drain electrodes and the third source electrode; and forming a pixel electrode on the passivation layer connected with the first and second drain electrodes and the third source electrode to form a thin film transistor (TFT) array panel.

The gate line may include a present gate line for transferring a gate signal to a corresponding pixel, a previous gate line for transferring a gate signal to a previous pixel, and a gate line before the previous gate line for transferring a gate signal to a pixel before the previous pixel.

According to an embodiment, the method for manufacturing an EPD further includes forming a counter display panel with a common electrode formed thereon, forming a microcapsule layer on the common electrode, and attaching the counter display panel with microcapsule layer formed thereon to the TFT array panel, wherein microcapsule layer includes a plurality of microcapsules formed as positively and negatively charged pigment particles.

BRIEF DESCRIPTION OF THE DRAWING

The foregoing and other objects and features of the present invention may be better understood from a reading of the ensuing detailed description, together with the drawing in which.

DETAILED DESCRIPTION OF THE EMBODIMENTS

Figure 1:
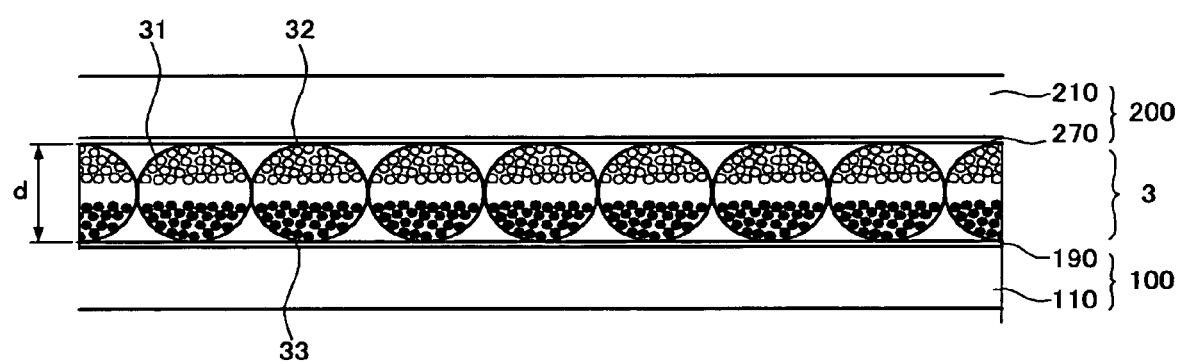
FIG. 1 is a drawing schematically showing an electrophoretic indication display) according to an exemplary embodiment of the present invention.

To clarify multiple layers and regions, the thicknesses of the layers are enlarged in the drawings. FIG. 1 is a drawing schematically showing an electrophoretic indication display (EPD) according to an exemplary embodiment of the present invention. As shown in FIG. 1, the EPD includes a lower panel 100 having a lower substrate 110 and a pixel electrode 190 formed on the lower substrate 110, an upper panel 200 facing the lower panel 100 and including an upper substrate 210 and a common electrode 270 formed on upper substrate 210, and a microcapsule layer 3 interposed between the lower panel 100 and upper panel 200 and including a plurality of microcapsules 31 which include positively charged white pigment particles 32 and negatively charged black pigment particles 33.

Figure 2:
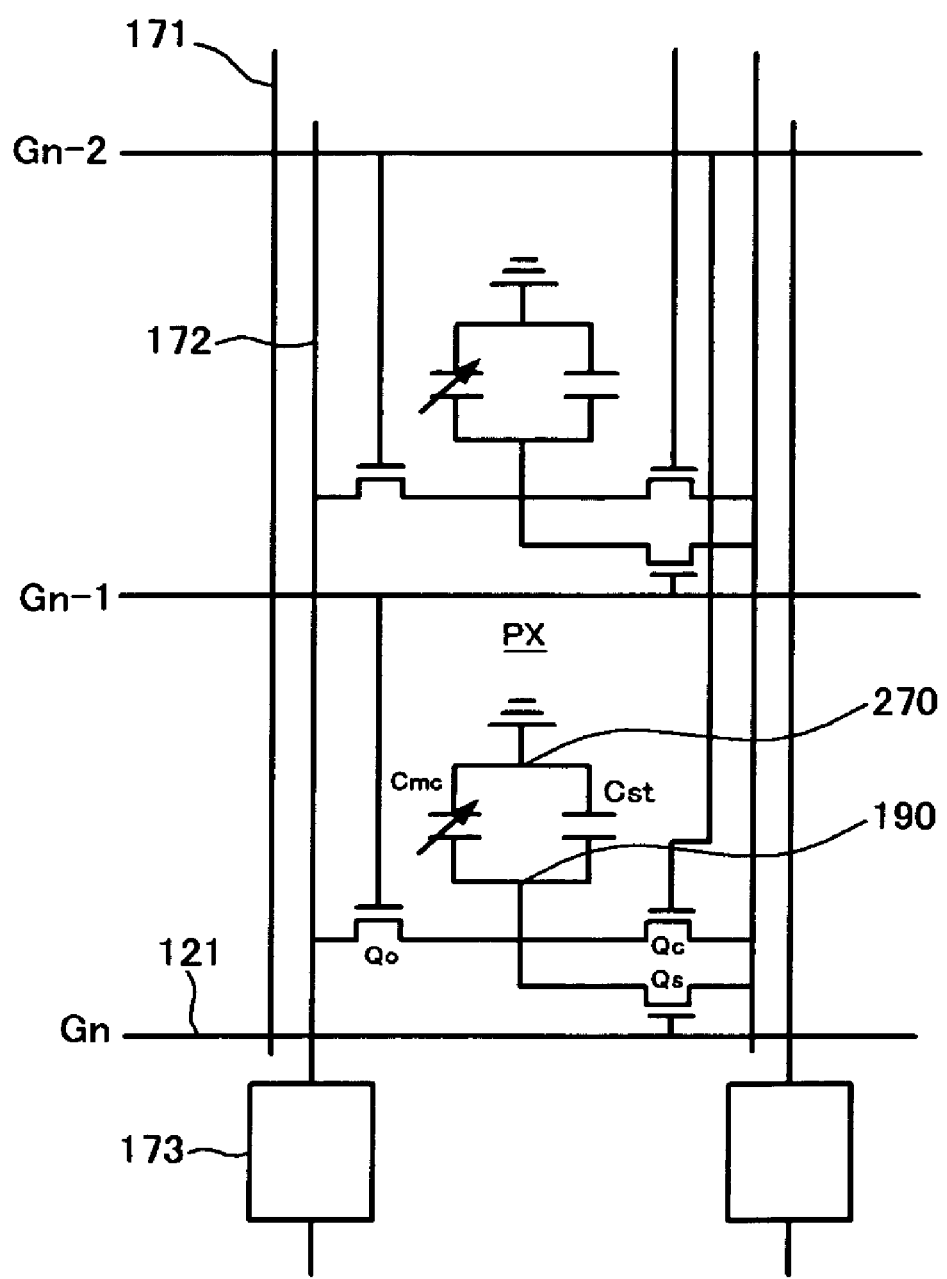
FIG. 2 shows an equivalent circuit of the EPD.

FIG. 2 shows an equivalent circuit of the EPD according to the exemplary embodiment of the present invention. As shown in FIG. 2, the EPD includes a plurality of signal lines 121, 171, and 172 and a plurality of pixels (PXs) which are connected with the signal lines 121, 171, and 172 and arranged substantially in a matrix. The signal lines include a plurality of gate lines 121 (Gn, Gn-1, and Gn-2) for transferring gate signals (or scanning signals), a plurality of data lines 171 for transferring data signals, and a plurality of sense signal lines 172 for outputting sense signals. Gate lines 121 extend substantially in a row direction and are parallel with each other, and data lines 171 and sense signal lines 172 extend substantially in a column direction and are parallel with each other.

Each pixel (PX) includes a switching transistor (Qs), a condensing transistor (Qc), an output transistor (Qo), a microcapsule capacitor (Cmc), and a storage capacitor (Cst). Storage capacitor (Cst) can be omitted if desired. Switching transistor Qs includes a control terminal, an input terminal, and an output terminal. The control terminal is connected with a present gate line 121 (Gn), the input terminal is connected with a data line 171, and the output terminal is connected with microcapsule capacitor (Cmc) and the storage capacitor (Cst).

Microcapsule capacitor (Cmc) uses pixel electrode 190 of the lower panel 100 and common electrode 270 of upper panel 200 as two terminals. Microcapsule layer 3 interposed between the two electrodes 190 and 270 serves as a dielectric material. Pixel electrode 190 is connected with switching transistor Qs, and common electrode 270 is formed on the entire surface of upper substrate 210 and receives a common voltage (Vcom). Storage capacitor (Cst), an auxiliary of microcapsule capacitor (Cmc), is formed as an extra signal line provided at the lower panel 100 and overlaps pixel electrode 190 with an insulator interposed therebetween. A predetermined voltage, such as the common voltage (Vcom) or the like, is applied to storage capacitor (Cst).

Microcapsule capacitor (Cmc) changes its value according to the change in a cell gap (d) corresponding to microcapsule layer 3. Condensing transistor (Qc) and output transistor (Qo) are provided in order to read any change in the capsule capacity.

Condensing transistor (Qc) includes a control terminal, an input terminal, and an output terminal. The control terminal is connected with the gate line positioned before the previous gate line (Gn-2), the input terminal is connected with data line 171, and the output terminal is connected with pixel electrode 190. The output transistor (Qo) also includes a control terminal, an input terminal, and an output terminal. The control terminal is connected with the previous gate line (Gn-1), the input terminal is connected with pixel electrode 190, and the output terminal is connected with a sense signal line 172.

Each sense signal line 172 is connected with a sense signal processing unit 173. Sense signal processing unit 173 senses whether there is a change in the cell gap (d) at a position of the corresponding pixel by comparing a signal applied to sense signal line 172 according to the operation of condensing transistor (Qc) and the output transistor (Qo) with a reference voltage.

In the EPD, when a gate ON signal is sequentially applied to the plurality of gate lines 121 by a gate signal, a data signal is applied to data lines 171 to make a potential difference between both ends of pixel electrode 190 and common electrode 270. Accordingly, the charged white and black pigment particles 32 and 33 disposed in microcapsule layer 3 move to electrodes with the opposite polarity, respectively, to thereby form an image.

Figure 4:
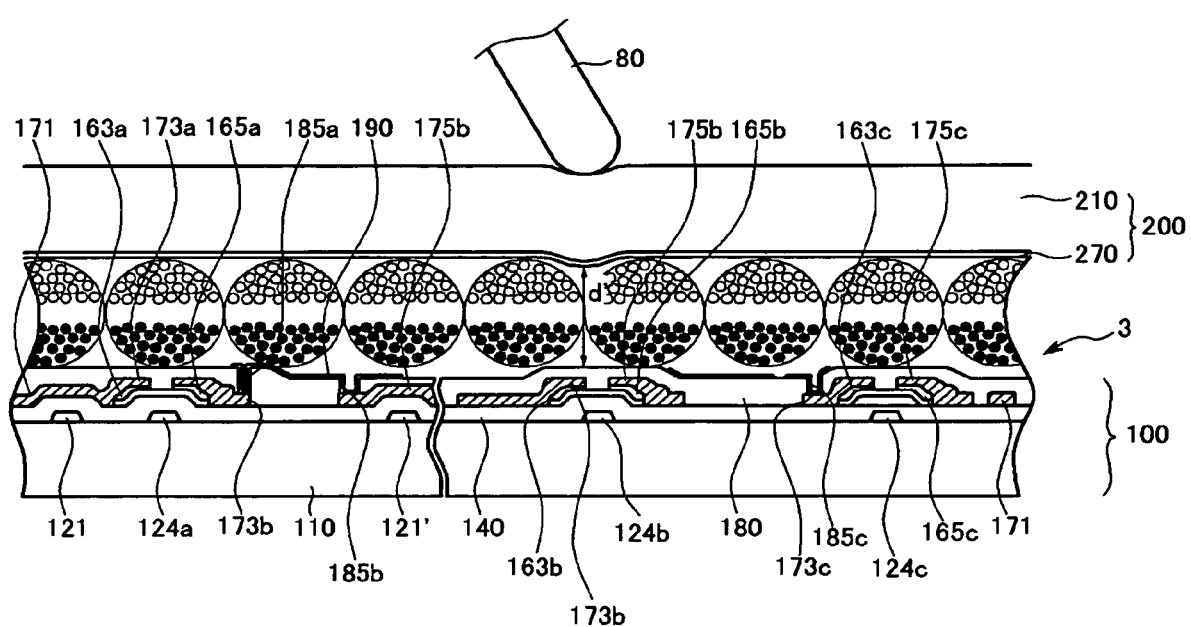
FIG. 4 is a cross-sectional view taken along line III-III of the EPD in FIG. 3.

When a particular pixel of the EPD is touched by a finger or other object 80, the cell gap (d) of microcapsule layer 3 changes, as shown in FIG. 4. The changed cell gap (d') of microcapsule layer 3 brings about a change in capacitance of the corresponding pixel. A touch screen function can be implemented by reading such a change in the capacitance of the pixel as an electrical signal.

When the gate ON signal is applied to the gate line before the previous gate line (Gn-2), condensing transistor (Qc) is turned on and a data voltage applied to the pixel before the previous pixel (namely, a pixel positioned before the previous pixel) is charged in microcapsule capacitor (Cmc) of the corresponding pixel. In this case, because the amount of electric charge (Q) charged in microcapsule capacitor (Cmc) of the corresponding pixel is uniform and the amount of electric charge is defined by the product of the capacitance and the data voltage, when the cell gap of the corresponding pixel is changed by a pressing unit such as a touch unit, the capacitance changes according to the change in the cell gap (d) of microcapsule layer 3, and accordingly, the data voltage charged in microcapsule capacitor (Cmc) of the corresponding pixel is also changed.

When the gate ON signal is applied to the previous gate line (Gn-1), output transistor (Qo) is turned on and the data voltage (referred to hereinafter as a 'pixel voltage') charged in the corresponding pixel is applied to sense signal line 172 so as to be input to sense signal processing unit 173. Sense signal processing unit 173 compares the pixel voltage applied to sense signal line 172 with a reference voltage to sense whether there is a change in the cell gap (d) at the corresponding pixel position.

When the gate ON signal is applied to the present gate line (Gn), switching transistor (Qs) is turned on and the data voltage applied to the corresponding pixel is charged as the pixel voltage to microcapsule capacitor (Cmc) of the corresponding pixel. In order to read the change in the cell gap of the corresponding pixel, the gate ON signal is applied to the gate line before the previous gate line (Gn-2) to temporarily charge the data voltage, which has been charged in the pixel before the previous pixel, in the corresponding pixel. This, however, occurs within a very short time compared with a frame time, so it can hardly be recognized by naked eyes.

Thus, in the EPD according to the exemplary embodiment of the present invention, output transistor (Qo) and condensing transistor (Qc) are formed without a touch panel to recognize a change in the pixel voltage according to a change in the cell gap, thereby implementing the touch screen function.

Figure 3:
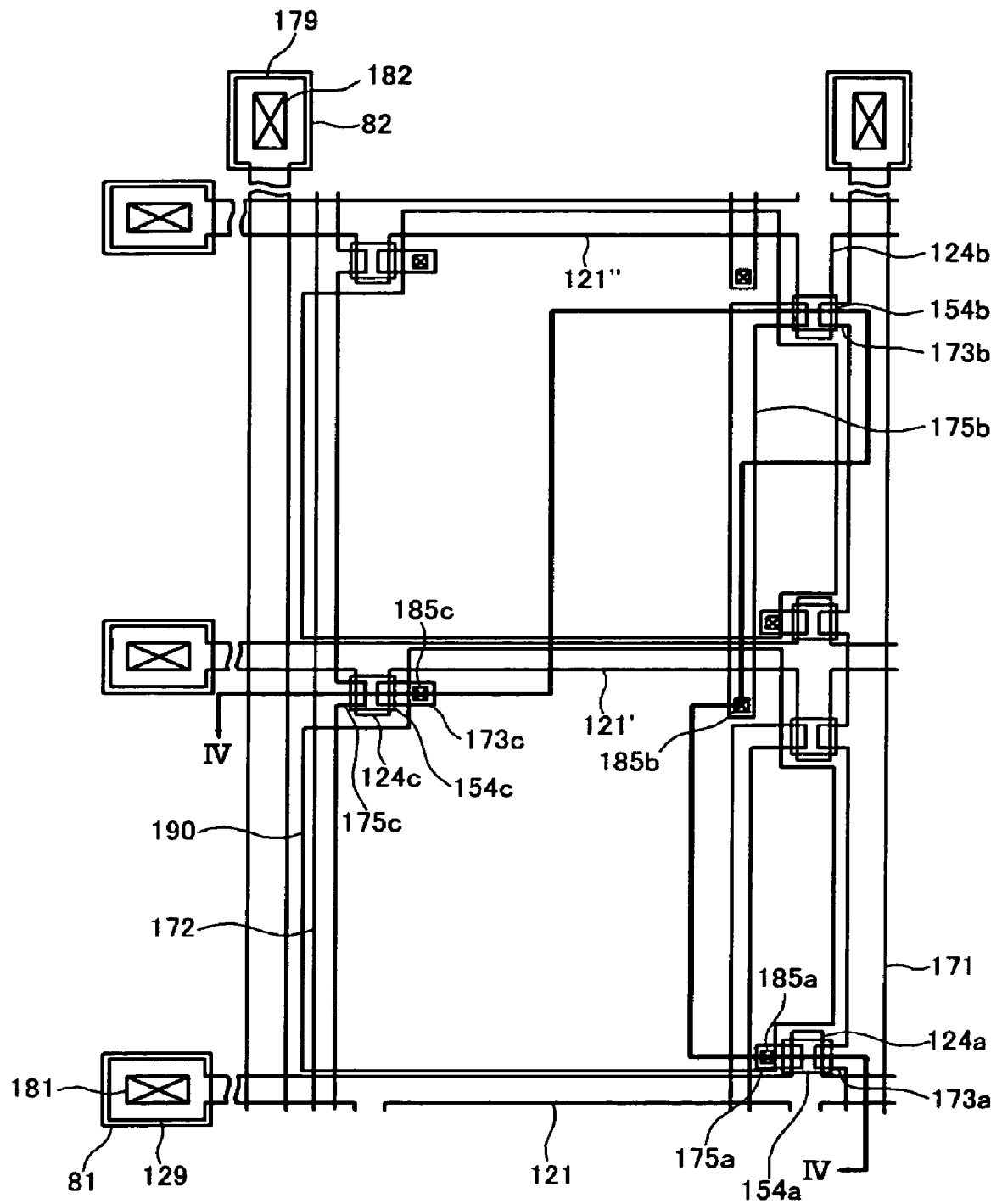
FIG. 3 is a layout view of the EPD according to the exemplary embodiment of the present invention.

The detailed structure of the EPD shown in FIGS. 1 and 2 will now be described in detail with reference to FIGS. 3 and 4. FIG. 3 is a layout view of the EPD according to the exemplary embodiment of the present invention, and FIG. 4 is a cross-sectional view taken along line III-III of the EPD in FIG. 3.

A plurality of gate lines 121, i.e., display signal lines, are formed on the insulation substrate 110 made of transparent glass or plastic. Gate lines 121 transfer gate signals and mainly extend in a horizontal direction. Each gate line 121 includes first to third gate electrodes 124a, 124b, and 124c which are projected up or down, and an end portion 129 with a larger area for connection with a different layer or an external driving circuit. Herein, a gate line 121, a previous gate line 121' and a gate line before the previous gate line 121" are discriminately shown for the sake of explanation.

The first gate electrode 124a is projected upward from the present gate line 121, the second gate electrode 124b is projected downward from the gate line before the previous gate line 121", and the third gate electrode 124c is projected downward from the previous gate line 121'.

Gate lines 121 can be made of an aluminum group metal such as aluminum (Al) or an aluminum alloy, a silver group metal such as Ag or an Ag alloy, a copper group metal such as copper (Cu) or a copper alloy, a molybdenum group metal such as molybdenum (Mo) or a molybdenum alloy, chromium (Cr), tantalum (Ta), and titanium (Ti), etc. Gate lines 121 can have a multi-layer structure including two conductive layers (not shown) each with different physical properties. In the multi-layer structure with two conductive layers, one conductive layer can be made of a metal with low resistivity, such as, an aluminum group metal, a silver group metal, or a copper group metal, to reduce a voltage drop. The other conductive layer can be made of a different material, namely, a material which has excellent physical, chemical, and electrical contact characteristics with respect to ITO (Indium Tin Oxide) and IZO (Indium Zinc Oxide), such as a molybdenum group metal, chromium, tantalum, or titanium. A good example of such a combination can include a combination of a lower chromium layer and an upper aluminum (alloy) layer and a combination of an aluminum (alloy) lower layer and an upper molybdenum (alloy) layer. In addition, gate line 121 can be made of various other metals or conductors.

The sides of gate line 121 are sloped toward the surface of the lower substrate 110, and, preferably, the slope angle is within the range of about 30° to 80°. A gate insulating layer 140 made of silicon nitride (SiNx) or silicon oxide (SiOx), etc., is formed on gate lines 121. First to third semiconductor islands 154a, 154b, and 154c made of hydrogenated amorphous silicon (a-Si) or polysilicon are formed on gate insulating layer 140. The first to third semiconductor islands 154a, 154b, and 154c are positioned on the first to third gate electrodes 124a, 124b, and 124c, respectively.

First to third ohmic contact islands 163a, 163b, 163c, 165a, 165b, and 165c are formed on the first to third semiconductor islands 154a, 154b, and 154c. The first to third ohmic contact islands 163a, 163b, 163c, 165a, 165b, and 165c can be made of a material such as n+ hydrogenated amorphous silicon in which n type impurities are doped with high density, such as phosphor, or silicide. The first to third ohmic contact islands 163a, 163b, 163c, 165a, 165b, and 165c are disposed as pairs on the first to third semiconductor islands 154a, 154b, and 154c.

Each side of the first to third semiconductor islands 154a, 154b, and 154c and the first to third ohmic contact islands 163a, 163b, 163c, 165a, 165b, and 165c is also sloped toward the surface of the lower substrate 110, and the slope angle is within the range of about 30° to 80°.

A plurality of data lines 171, pluralities of first and second drain electrodes 175a and 175b, a plurality of third source electrodes 173c, and a plurality of sense signal lines 172 are formed on the first to third ohmic contact islands 163a, 163b, 163c, 165a, 165b, and 165c and gate insulating layer 140.

Each data line 171 transfers a data signal and mainly extends in a vertical direction to cross gate lines 121. Each data line 171 includes first and second source electrodes 173a and 173b that extend toward the first and second gate electrodes 124a and 124b, and an end portion 179 with a larger area for connection with a different layer or an external driving circuit. Each second source electrode 173b partially overlaps with each second gate electrode 124b formed on each gate line 121, and each second drain electrode 175b extends from one pixel to the next pixel.

Sense signal line 172 is formed to be parallel with data line 171, and includes a third drain electrode 175c extending toward the third gate electrode 124c.

The first gate electrode 124a, the first source electrode 173a, and the first drain electrode 175a constitute a switching TFT together with the first semiconductor island 154a, and a channel of switching TFT is formed at the first semiconductor island 154a between the first source electrode 173a and the first drain electrode 175a. Likewise, the second gate electrode 124b, the second source electrode 173b, and the second drain electrode 175b constitute a condensing transistor Qc together with the second semiconductor island 154b, and the third gate electrode 124c, the third source electrode 173c, and the third drain electrode 175c constitute an output transistor Qo together with the third semiconductor island 154c.

Preferably, data line 171, sense signal line 172, and the first to third drain electrodes 175a, 175b, and 175c are made of a refractory metal such as molybdenum, chromium, tantalum, titanium, and their alloy, and can have a multi-layer structure including a refractory metal layer (not shown) and a low resistance conductive layer (not shown). Examples of the multi-layer structure can include a dual-layer composed of a lower chromium or molybdenum (alloy) layer and an upper aluminum (alloy) layer, and a triple-layer composed of a lower molybdenum (alloy) layer, a middle aluminum (alloy) layer, and an upper molybdenum (alloy) layer. Besides, data line 171 and the first to third drain electrodes 175a, 175b, and 175c can be made of various other metals or conductors. Preferably, each side of data line 171, sense signal line 172, and the first to third drain electrodes 175a, 175b, and 175c is also sloped toward the surface of the lower substrate 110 at a slope angle of about 30° to 80°.

The first to third ohmic contact islands 163a, 163b, 163c, 165a, 165b, and 165c are present only between the upper first to third semiconductor islands 154a, 154b, and 154c and the lower data line 171 and first to third drain electrodes 175a, 175b, and 175c, and lower contact resistance therebetween. The semiconductor islands 154a, 154b, and 154c include exposed portions, like portions between the source electrodes 173a, 173b, and 173c and the drain electrodes 175a, 175b, and 175c, which are not covered by data line 171 and the drain electrodes 175a, 175b, and 175c.

A passivation layer 180 is formed on data line 171, the drain electrodes 175a, 175b, and 175c, and the exposed portions of the semiconductor islands 154a, 154b, and 154c. The passivation layer 180 is formed of a non-organic insulator or an organic insulator and its surface can be planarized. The non-organic insulator can be, for example, silicon nitride or silicon oxide. The organic insulator can have photosensitivity and its dielectric constant is preferably about 4.0 or less. The passivation layer 180 can have a dual-layer structure including a lower inorganic layer and an upper organic layer so that it may not do harm to the exposed portions of the semiconductor islands 154a, 154b, and 154c while sustaining the excellent insulating characteristics of the organic layer.

The passivation layer 180 includes a plurality of contact holes 182, 185a, 185b, and 185c respectively exposing the end portions 179 of data lines 171, the first and second drain electrodes 175a and 175b, and the third source electrode 173c, and also a plurality of contact holes 181 exposing end portions 129 of gate lines 121 are formed in the passivation layer 180 and gate insulating layer 140.

A plurality of pixel electrodes 190 and a plurality of contact assistants 81 and 82 are formed on the passivation layer 180. They can be made of a transparent conductive material such as ITO or IZO, or a reflexive metal such as aluminum, silver, chromium, or their alloy.

Pixel electrodes 190 are physically and electrically connected with the first and second drain electrodes 175a and 175b and the third source electrodes 173c through the contact holes 185a, 185b, and 185c.

Upper substrate 210 is formed above pixel electrode 190 in a facing manner, and common electrode 270 is formed over the entire surface of upper substrate 210. Microcapsule 3 in which the plurality of microcapsules 31 are provided is formed between pixel electrode 190 and common electrode 270.

A data voltage is applied from the first drain electrode 175a, and when pixel electrode 190 receives the data voltage, it generates an electric field together with common electrode 270 of upper display panel 200 which has received a common voltage, whereby the charged white and black pigment particles 32 and 33, that are provided in microcapsule layer 3 between the two electrodes 190 and 270, can move toward the electrode with the opposite polarity, respectively, to form an image.

A data voltage which is applied to the pixel before the previous pixel is applied to pixel electrode 190 through the second drain electrode 175b, and when pixel electrode 190 receives the data voltage, it charges the data voltage together with common electrode 270.

A data voltage, which has been charged in the corresponding pixel from the third drain electrode 175c is applied to sense signal line 172 so as to be input to sense signal processing unit 173. Then, sense signal processing unit 173 compares the pixel voltage, which has been applied to sense signal line 172, with the reference voltage to check whether there is a change in the cell gap (d) at the corresponding pixel position.

Figure 5:
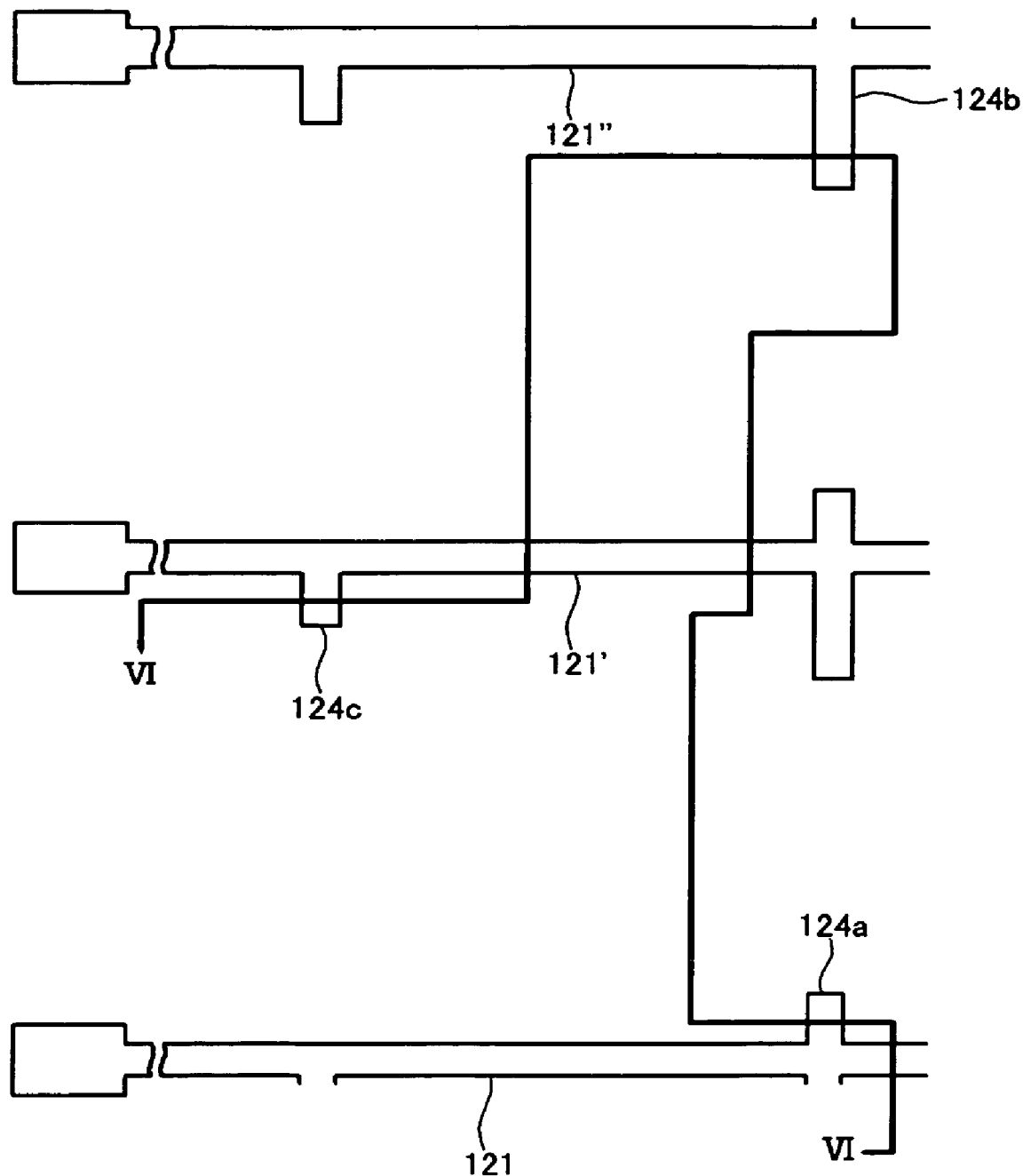
FIGS. 5, 7, 9 and 11 are layout views of interim stages of a method for manufacturing the EPD in FIG. 3 according to the exemplary embodiment of the present invention.
Figure 6:
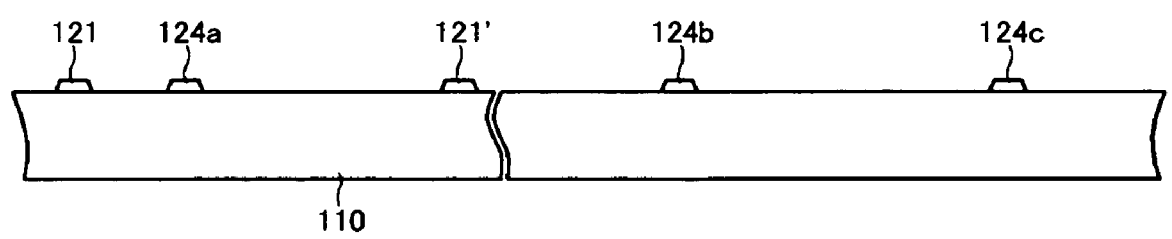
FIG. 6 is a cross-sectional view taken along line V-V of the EPD in FIG. 5 according to the exemplary embodiment of the present invention.

A method for manufacturing the EPD according to another embodiment of the present invention will be described with reference to FIGS. 5 to 12 and also FIGS. 3 and 4. First, as shown in FIGS. 5 and 6, a conductive layer, which is made of an aluminum group metal such as aluminum (Al) or an aluminum alloy, a silver group metal such as Ag or an Ag alloy, a copper group metal such as copper (Cu) or a copper alloy, a molybdenum group metal such as molybdenum (Mo) or a molybdenum alloy, chromium (Cr), tantalum (Ta), and titanium (Ti), etc., is deposited on the lower substrate 110 made of transparent glass through sputtering, and then wet-etched or dry-etched to form a gate line 121 including a plurality of gate electrodes 124a, 124b, and 124c and an end portion 129.

Figure 7:
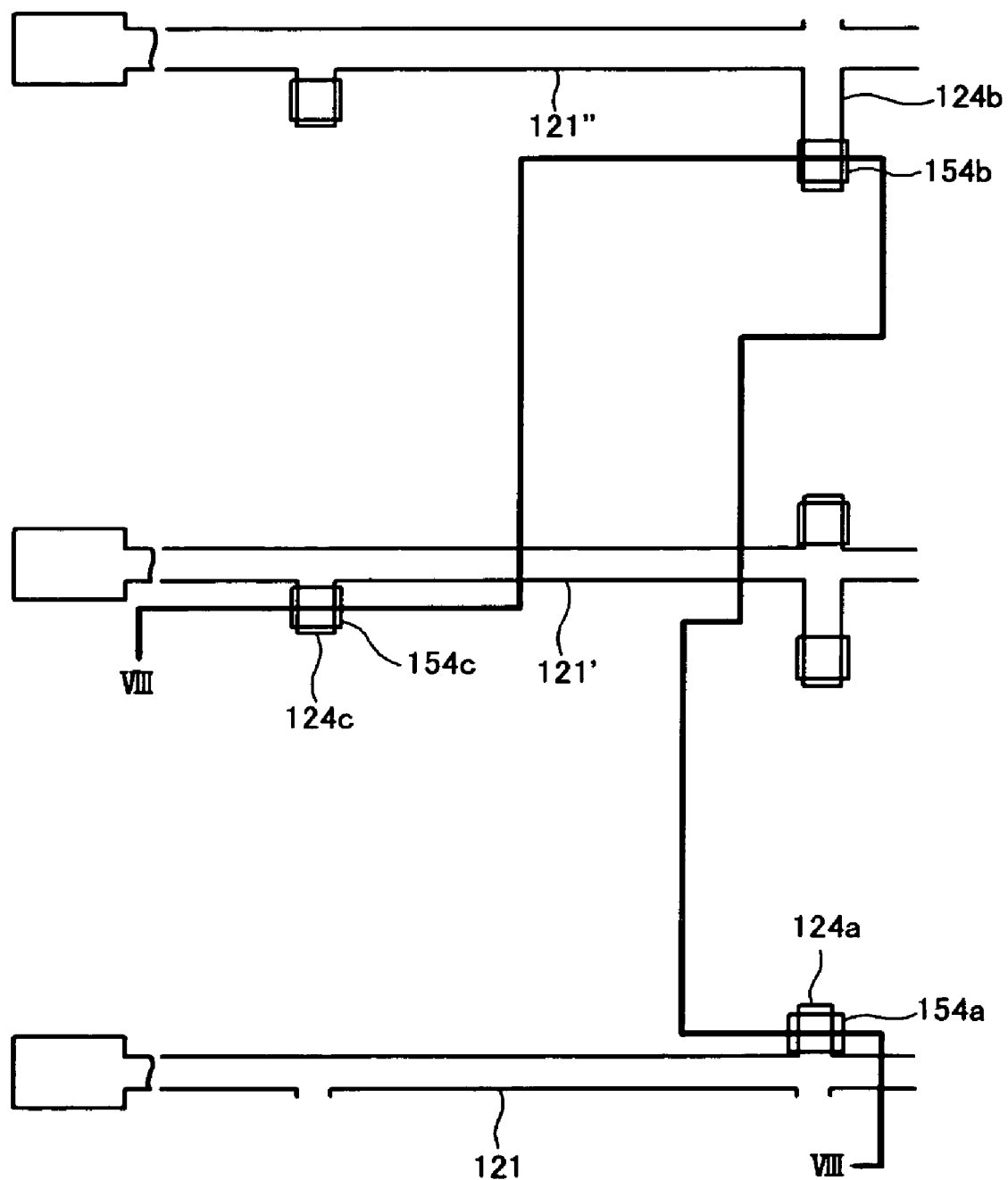
Figure 8:
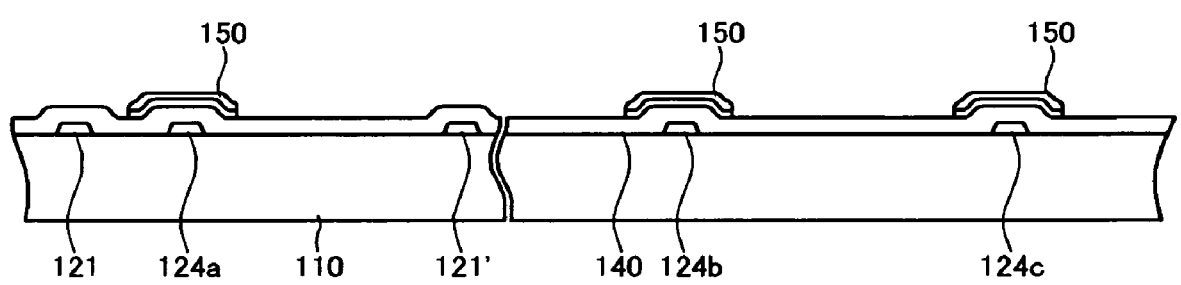
FIG. 8 is a cross-sectional view taken along line VII-VII of the EPD in FIG. 7 according to the exemplary embodiment of the present invention.

Next, as shown in FIGS. 7 and 8, three layers of a gate insulating layer 140 with a thickness of about 1,500 Å~5000 Å, an intrinsic amorphous silicon layer with a thickness of about 500 Å~2,000 Å, and an extrinsic amorphous silicon layer with a thickness of about 300 Å~600 Å are successively stacked. And then, the impurity (extrinsic) amorphous silicon layer and the intrinsic amorphous silicon layer are etched by photolithography to form a plurality of impurity semiconductor islands 150 on gate insulating layer 140.

Figure 9:
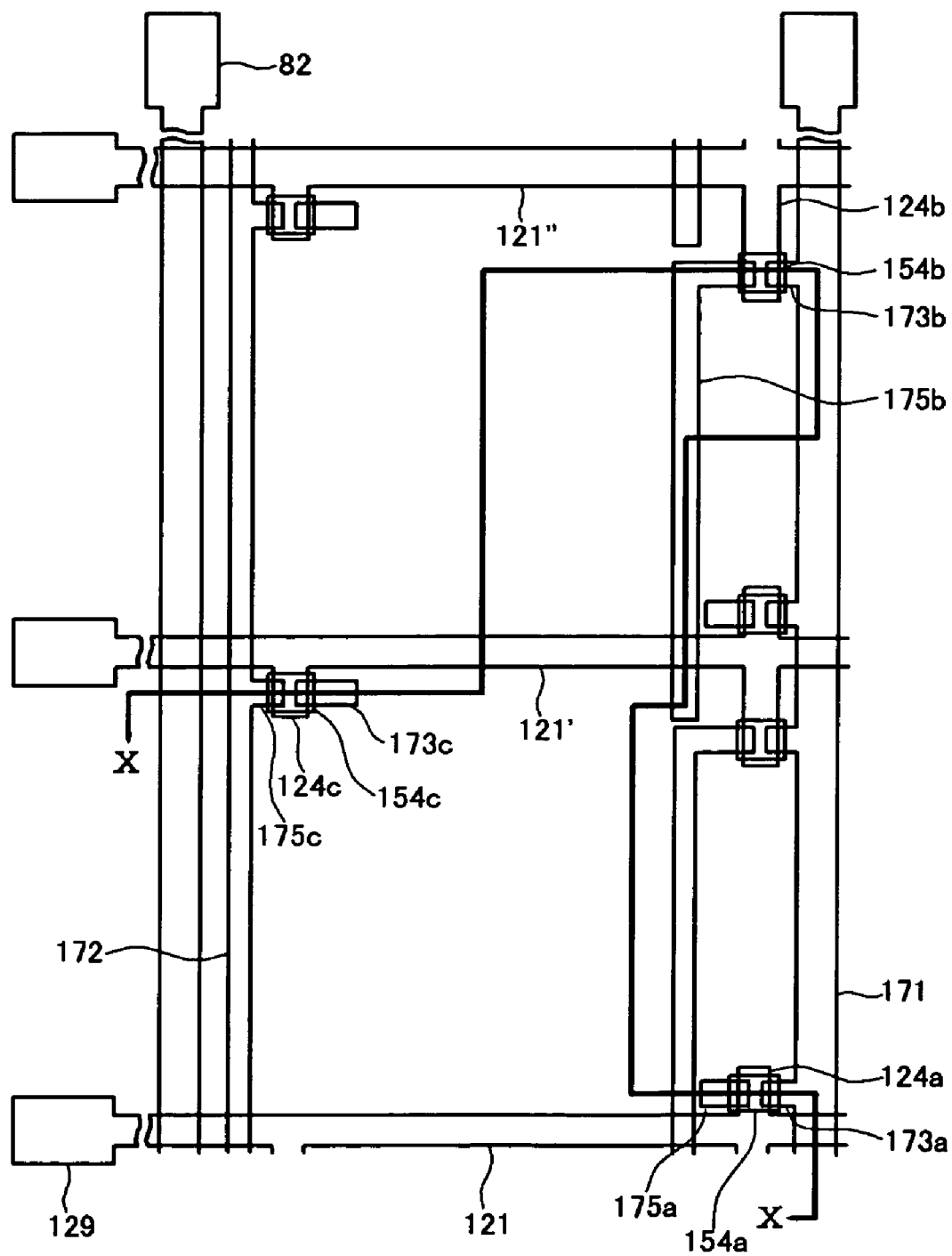
Figure 10:
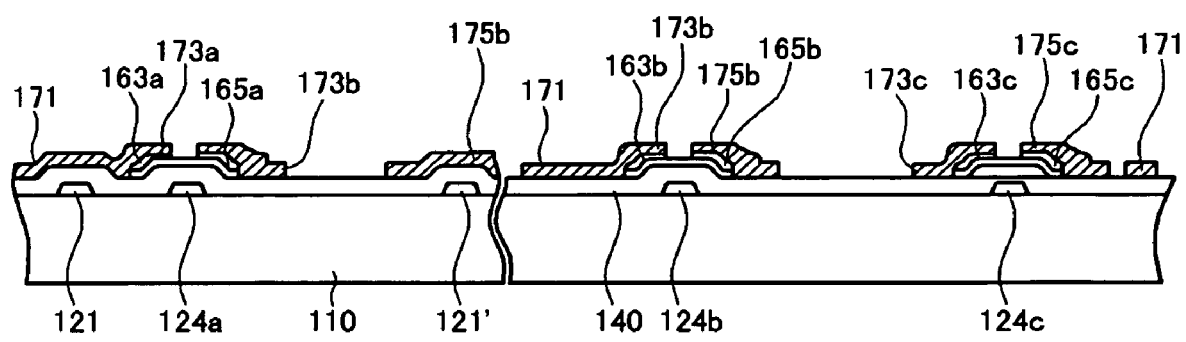
FIG. 10 is a cross-sectional view taken along line IX-IX of the EPD in FIG. 9 according to the exemplary embodiment of the present invention.

Thereafter, as shown in FIGS. 9 and 10, a conductive layer, which is made of an aluminum group metal such as aluminum (Al) or an aluminum alloy, a silver group metal such as Ag or an Ag alloy, a copper group metal such as copper (Cu) or a copper alloy, a molybdenum group metal such as molybdenum (Mo) or a molybdenum alloy, chromium (Cr), tantalum (Ta), and titanium (Ti), etc., is deposited with a thickness of 1,500 Å~3,000 Å through a method such as sputtering and then patterned to form a plurality of data lines 171 including a plurality of source electrodes 173a, 173b, and 173c, and end portions 179, and a plurality of drain electrodes 175a, 175b, and 175c.

Subsequently, exposed portions of the impurity semiconductor islands 150 which are not covered by data line 171 and the drain electrodes 175a, 175b, and 175c are removed to complete a plurality of ohmic contact islands 163a, 163b, 163c, 165a, 165b, and 165c, and the lower intrinsic semiconductor islands 154a, 154b, and 154c are exposed.

Figure 11:
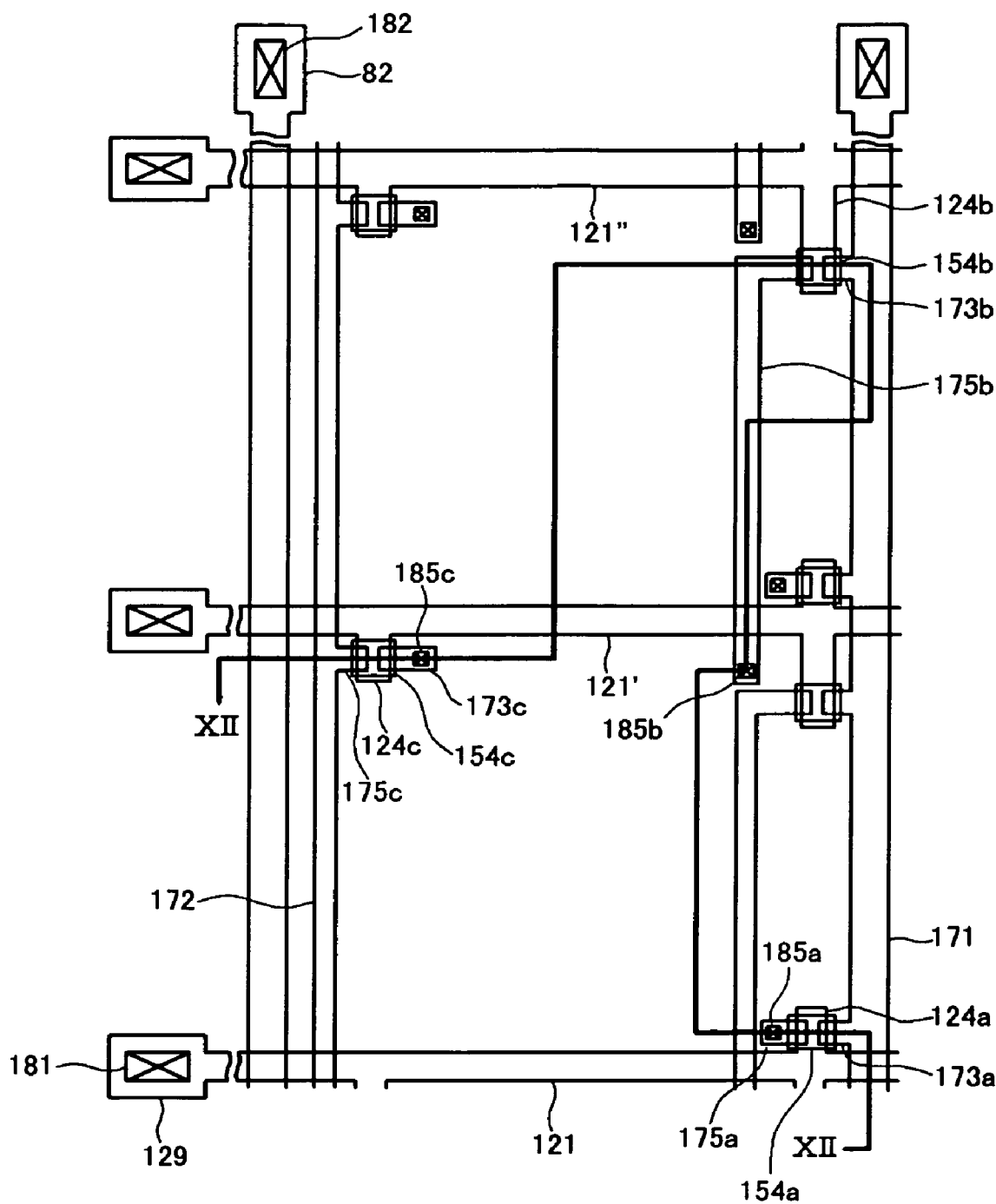
Figure 12:
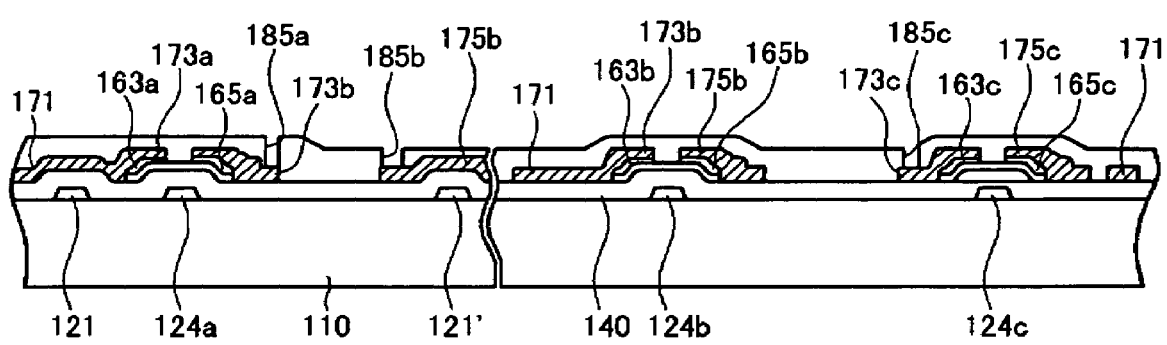
FIG. 12 is a cross-sectional view taken along line XI-XI of the EPD in FIG. 11 according to the exemplary embodiment of the present invention.

And then, as shown in FIGS. 11 and 12, a passivation layer 180 is coated and then etched by photolithography to form a plurality of contact holes 182, 185a, 185b, and 185c that expose the end portions 179 of data lines 171 and portions of the first and second electrodes 175a and 175b, and the source electrodes 173c, and also to form a plurality of contact holes 181 that expose a portion of gate insulating layer 140 positioned on the end portions 129 of gate lines 121.

Next, as shown in FIGS. 3 and 4, an IZO film or an ITO film with a thickness of about 400 Å~500 Å is stacked through sputtering and then etched by photolithography to form a plurality of pixel electrodes 190 and a plurality of contact assistants 81 and 82 on the passivation layer 180, the exposed portions of the end portions 129 of gate lines 121, the first and second drain electrodes 175a and 175b, and the third source electrodes 173c, and the exposed portions of the end portions 179 of data lines 171.

Thereafter, upper panel 200, with common electrode 270 and microcapsule layer formed at the upper portion of upper substrate 210, is laminated on pixel electrode 190.

The EPD according to the exemplary embodiment of the present invention can advantageously recognize a change in the pixel voltage according to a change in the cell gap by forming the output transistor and the condensing transistor, without using a touch panel, to thereby implement a touch screen function.

While this invention has been described in connection with what is presently considered to be practical exemplary embodiments, it is to be understood that numerous modifications and equivalent arrangements will be apparent to those skilled in the art and may be made without, however, departing from the spirit and scope of the invention.

What is claimed is:

1. An electrophoretic display having a pair of substrates separated by a microcapsule layer, a plurality of pixels formed at the intersections of rows of gate lines and columns of data lines on at least one of the substrates, comprising:
   at least one of said substrates being sufficiently flexible when touched to change the separation between said substrates at any of said pixels;
   a plurality of sense signal lines formed parallel to the data lines; and
   a sense signal processing unit connected with the sense signal lines for sensing a change in capacitance between said substrates at any of said pixels,
   wherein the microcapsule layer comprises a plurality of microcapsules having positively charged pigment particles and negatively charged pigment particles.

2. The electrophoretic display of claim 1 having a plurality of switching elements connected to said pixels at the intersections of said data lines and gate lines.

3. The electrophoretic display of claim 2 wherein respective ones of said switching elements are connected to a gate line, a data line and a sensing line.

4. The electrophoretic display of claim 3 wherein the gate lines are sequentially scanned and wherein said switching elements are thin film transistors (TFTs).

5. The electrophoretic display of claim 4 wherein:
   a first TFT connected to a current pixel charges the pixel capacitance from the data signal present when the gate line for the row two before the current pixel's row is scanned;

a second TFT connected to the current pixel for reading the charge on the current pixel when the gate line for the row before the current pixel is scanned; and a third TFT connected to the current pixel for charging the current pixel from the data signal present when the gate line for the current pixel's row is scanned to display the current image.

6. A method for manufacturing an electrophoretic display comprising:

forming a plurality of gate lines on a first substrate;

forming a gate insulating layer that covers the gate lines;

forming a semiconductor layer on the gate insulating layer;

forming a plurality of data lines orthogonal to said gate lines on the gate insulating layer;

forming a plurality of sense signal lines parallel to the data lines;

forming a passivation layer for covering the data lines and the sense signal lines having contact holes that expose portions of said semiconductor layer;

forming a pixel electrode connected with said exposed portions of said semiconductor layer to form first, second and third thin film transistors connected to respective ones of said gate lines, forming a common electrode on a second substrate; and forming a microcapsule layer between the first and second substrates, wherein the microcapsule layer comprises a plurality of microcapsules formed as positively and negatively charged pigment particles.

7. The method of claim 6, wherein the gate lines comprise:

a present gate line for transferring a gate signal to a present pixel;

a previous gate line for transferring a gate signal to a previous pixel; and a gate line before the previous gate line for transferring a gate signal to a pixel before the previous pixel.

8. The method of claim 7, wherein the first of the thin film transistors at said present pixel has an electrode connected to the present gate line;

the second of said thin film transistors at said present pixel has an electrode connected to said previous gate line; and the third of said thin film transistors at said present pixel has an electrode connected to the gate line before the previous gate line.

9. The method of claim 8 wherein:

said first of said thin film transistors has an electrode connected to a data line.

10. The method of claim 9 wherein the third of said thin film transistors has an electrode also connected to said data line.

11. The method of claim 9, wherein the thin film transistor formed at a previous pixel has an electrode elongated up to the present pixel.

12. The method of claim 8, wherein said second of said thin film transistors has an electrode connected to a sense signal line.

* * * * *